United States Patent [19]
Dugan et al.

[11] 3,790,915
[45] Feb. 5, 1974

[54] MOUNTING ARRANGEMENT FOR ELECTRICAL PLUG-IN COMPONENTS

[75] Inventors: Alanson G. Dugan, East Norwich; John Lockyer, Smithtown, both of N.Y.

[73] Assignee: Deutach Relays, Inc., East Northport, N.Y.

[22] Filed: Feb. 14, 1972

[21] Appl. No.: 225,957

[52] U.S. Cl. ........... 339/88 R, 339/113 R, 339/128, 339/192 RL
[51] Int. Cl. ........................ H01r 13/54, H02b 1/02
[58] Field of Search 248/27; 339/75, 88, 91, 119 R, 339/121, 125, 126, 128, 192 RL

[56] References Cited
UNITED STATES PATENTS

| | | | |
|---|---|---|---|
| 3,671,921 | 6/1972 | Baker et al. | 339/59 M |
| 3,651,446 | 3/1972 | Sadogievski et al. | 339/126 R |
| 3,146,051 | 8/1964 | Woofter et al. | 339/128 X |
| 2,869,098 | 1/1959 | Sauer | 339/75 T |

FOREIGN PATENTS OR APPLICATIONS

| | | | |
|---|---|---|---|
| 1,466,868 | 12/1966 | France | 339/121 |
| 1,196,099 | 6/1970 | Great Britain | 339/91 R |
| 1,008,378 | 5/1957 | Germany | 339/75 R |

*Primary Examiner*—Marvin A. Champion
*Assistant Examiner*—Lawrence J. Staab

[57] ABSTRACT

An arrangement for supporting electrical plug-in components which includes a mounting member defining an opening through which extend the opposed flexible walls of an attaching unit having a bottom portion which carries one component to be secured, this component having abutments to engage the undersurface of the mounting member, while tabs on the opposed walls engage the upper surface of the mounting member, the other component fitting between the opposed walls and having a spring-loaded, manually-operable, rotatable latching arrangement engaging the ends of the opposed walls to hold the other component in place.

15 Claims, 5 Drawing Figures

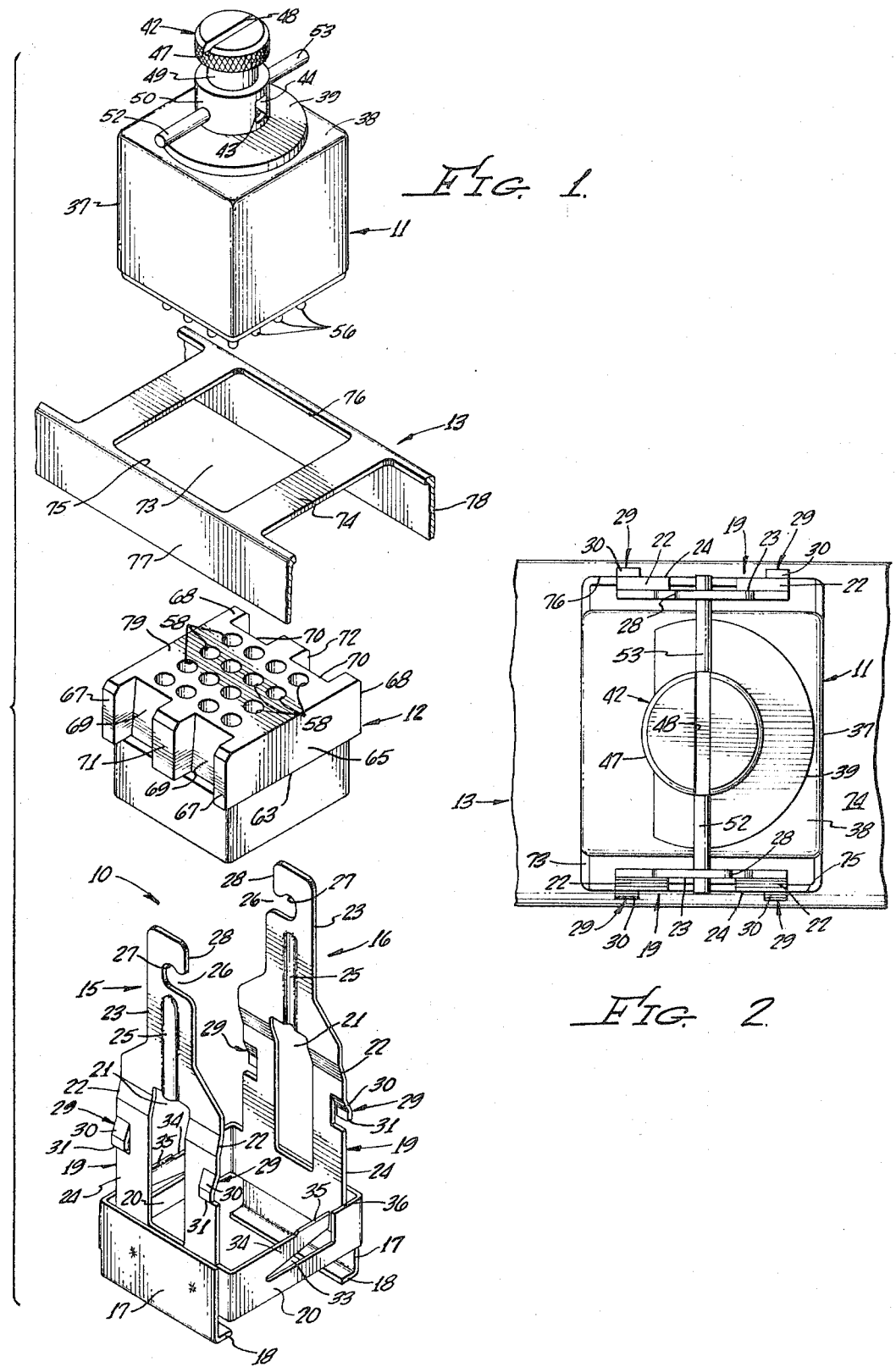

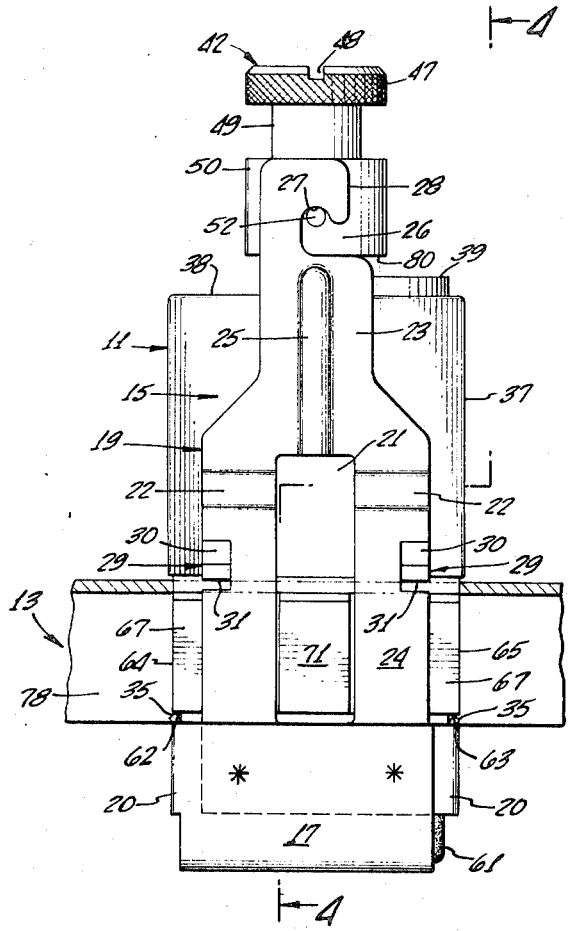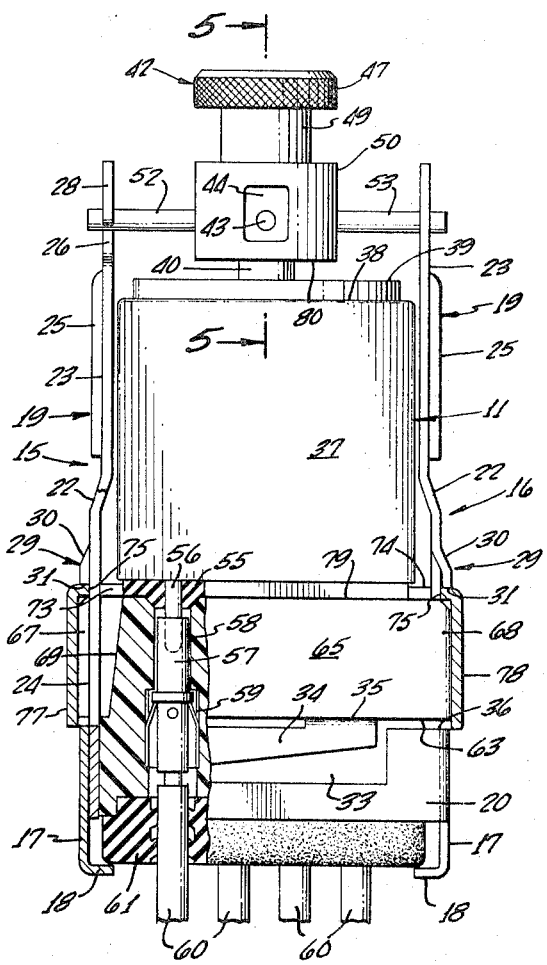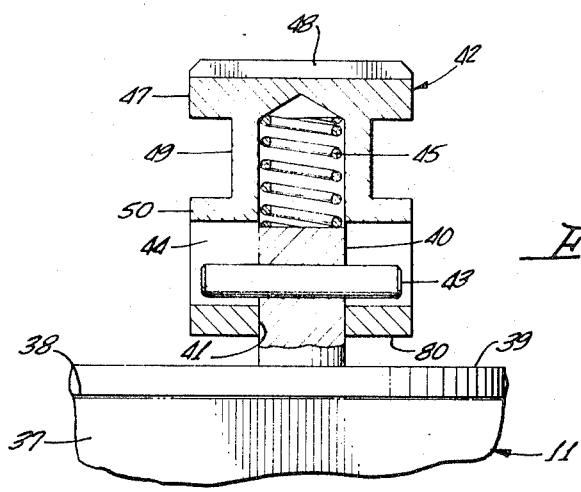

MOUNTING ARRANGEMENT FOR ELECTRICAL PLUG-IN COMPONENTS

BACKGROUND OF THE INVENTION

1. Field of the Invention

This invention relates to a mounting arrangement for electrical plug-in components, such as relays and sockets.

2. Description of Prior Art

In aircraft and other locations, it becomes necessary to mount a number of plug-in components, such as relays, on a support, such as a chassis or track, where they engage mating sockets. Conventionally, this is accomplished through the use of studs and nuts. Several difficulties are encountered through the use of such mounting arrangements. Space is severely limited within an aircraft, which restricts the access to the securing means. Expensive special tools frequently are necessary to allow installation and removal of the relays. Even so, crowded spacing may prohibit individual relay removal. For field maintenance, such special tools may not be available when removal and replacement becomes necessary. Working with tools within the limited space available can result in damage to the relays or sockets. This may be in the form of latent defects which do not become apparent until the aircraft is in service and which, therefore, can have serious consequences. Even under the best circumstances, the stud and nut connections for the plug-in components are laborious and time consuming, both for installation and disassembly. The threaded connections also are subject to possible loosening under vibrational loads and, in some instances, the nuts may not be properly tightened when the installation is made.

SUMMARY OF THE INVENTION

The present invention provides an improved means for mounting plug-in components on a chassis in an aircraft or other location, avoiding the use of tools, while permitting a secure connection to be rapidly and easily effected. Correspondingly, the components being secured are protected from damage.

The device of this invention includes an attaching unit which is made up of identical sheet metal components welded together. These define a rectangular lower portion into which the socket fits above inwardly bent lower flanges. Spring arms on the walls of the lower portion of the attaching unit engage shoulders on the socket to support the socket. Two opposed walls project upwardly from the rectangular lower portion of the attaching unit, each including a flexible lower portion and a relatively rigid upper part. Outwardly bent tabs are included on the lower portions of these opposed walls, while bayonet slots are formed in the upper ends of the walls. With the socket in place, the attaching unit is inserted from the bottom through an opening in the track or chassis, which causes the flexible lower opposed walls to be bent inwardly as the tabs pass the edges of the opening. Beyond the opening, the tabs snap into place over the surface of the track. The socket includes outwardly projecting flanges which engage the undersurface of the track to cooperate with the tabs in holding the unit in place.

A rotatable spring-loaded latching mechanism is secured to the upper wall of the relay. This includes a post on which is a knob that can move both rotationally and axially relative to the post. A spring biases the knob outwardly, while a stop limits its movement. Bayonet pins on the knob are adapted to enter bayonet slots in the upper ends of the opposed walls.

The relay is installed simply by moving it downwardly between the opposed walls of the attaching device so that the pin contacts on the relay can enter the openings in the socket to engage the mating contacts. The knob is rotated to cause the bayonet pins to enter the bayonet slots at the ends of the opposed walls, while the spring maintains the pins at the recessed inner ends of the bayonet slots. Accordingly, the installation requires no tools and is very rapidly accomplished.

A cross slot in the end of the knob, which may be painted a contrasting color, gives a positive indication of the rotational position of the bayonet pins and, hence, whether or not the latch is properly engaged. The knob is limited in its axial travel and will not allow the pins to enter the bayonet slots unless the relay is fully mated with the socket. This assures electrical and environmental sealing integrity, and avoids mismatch of parts. When the relay is secured in the unit, the opposed walls cannot be flexed inwardly sufficiently to free the tabs from the track. Consequently, there is a positive interlock when the relay is secured. For removal of the relay, the knob merely is rotated a few degrees to free the bayonet pins from the bayonet slots, the knob then being employed to pull the relay away from the socket, again without the use of tools. The knob is undercut, so that it is easily gripped for removing the relay. With the relay removed, the lower parts of the walls of the attaching unit may be flexed inwardly to free the tabs and allow disassembly.

The arrangement of this invention permits the relays or other plug-in components to be mounted very closely in a matrix, while still allowing easy installation and removal without the need of tools. The attachment is quite secure and not vulnerable to vibrational loads or other environmental conditions. There are no loose or detachable parts. The relay and socket also may be assembled independently of the chassis for inspection when required.

BRIEF DESCRIPTION OF THE DRAWINGS

FIG. 1 is a perspective exploded view of the arrangement of this invention;

FIG. 2 is a top plan view of the components of the invention in the assembled position;

FIG. 3 is a side elevational view, partially in section, of the arrangement of FIG. 2;

FIG. 4 is a longitudinal sectional view taken along line 4—4 of FIG. 3; and

FIG. 5 is an enlarged fragmentary sectional view taken along line 5—5 of FIG. 4.

DESCRIPTION OF THE PREFERRED EMBODIMENT

The arrangement of this invention includes an attachment assembly 10, which is used in securing a relay 11 and an associated socket 12 in a track 13. The latter unit typically is mounted in an aircraft. Ordinarily, a single track will mount a number of relays throughout its length, but for clarity only one relay is illustrated and described.

The attaching assembly 10 is made up of two identical resilient sheet metal parts 15 and 16, each of which is U-shaped in plan. Each of these parts includes an end wall 17 having an inwardly bent flange 18 along its lower edge. The opposite wall 19 is connected to the wall 17 by an intermediate wall 20, which is perpendicular to the two walls 17 and 19. The wall 19 is much higher than the walls 17 and 20, extending well beyond the upper edges of the latter two walls. Intermediate the ends of the wall 19 is an elongated opening 21. A shot, laterally inwardly inclined section 22 causes the upper portion 23 of the wall 19 to be parallel to, but inwardly of, the lower part 24 of the wall 19. Longitudinally of the upper section 23 is a reinforcing rib 25 for increased rigidity. A bayonet slot 26, having an inner recess 27, extends inwardly from the edge 28 of the upper section 23 which is adjacent the central member 20.

Below the inclined section 22, there are two laterally outwardly bent tabs 29 at the opposite edges of the lower wall portion 24. The tabs 29 include downwardly inclined portions 30 that terminate in horizontal bottom edges 31, which are used as abutments.

The wall of the intermediate section 20 is provided with a cutout 33 which results in a spring arm 34 along the upper part of the section 20. The distal end 35 of the spring arm 34 extends upwardly beyond the upper edges 36 of the remainder of the section 20 and is outwardly bent.

The members 15 and 16 are spot-welded together to provide a unitary assembly. The welds are accomplished where the wall 17 of the member 16 overlies the wall 19 of the member 15, and where the wall 17 of the member 15 extends over the wall 19 of the member 16. When so assembled, the lower part of the unit 10 defines a rectangular space bounded by the walls 19 and 20, with opposed flanges 18 extending inwardly at the bottom end. The bayonet slots 26 of the two members 15 and 16 face in opposite directions at the upper end of the unit.

The operative parts of the relay 11 are contained within a housing or can 37 to the upper surface 38 of which is brazed a plate 39 from which a post 40 extends upwardly (see FIG. 5). The post 40, which has a cylindrical exterior, is received within a complementary opening 41 in a knob 42. A pin 43 extends diametrically through the post 40 and projects outwardly beyond it on either side. The pin 43 is received within a rectangular opening 44 in the knob 42, which has its axis perpendicular to that of the opening 41. The opening 44 is wider than the pin 43 so that limited angular movement of the knob 42 is permitted relative to the post 40. The opening 44 also is elongated in the vertical direction so that the knob 42 may move axially relative to the post 40. A compression spring 45 is received in the upper end of the opening 41, one end of the spring bearing against the knob 42 at the end of the opening 41, while the other end of the spring engages the end of the post 40. This biases the knob 42 normally to an upward position with respect to the post 40 and, hence, relative to the relay 11.

The knob 42 includes an upper part 47 having a knurled circumferential surface and a transverse slot 48. Beneath the upper part 47, the section 49 of the knob is of reduced diameter, while the lower portion 50 has the same diameter as the upper part 47. Thus, the knob can conveniently be gripped and moved rotationally or axially by virtue of the knurled exterior surface at the upper portion and the reduced diameter at the portion 49.

Two elongated pins 52 and 53 project outwardly from the lower section 50 of the knob 42 perpendicularly to its axis. The pins 52 and 53 also are perpendicular to the axis of the opening 44 that receives the pins 43 of the post 40.

At the lower surface of the relay 11 is a resilient rubber gasket 55 through which extend electrical pin contacts 56. These contacts are adapted to enter socket contacts 57 held within openings 58 in the socket 12 by suitable means, such as retention clips 59. Wires 60 extend through openings in a sealing grommet 61 to engage the contacts 57. Consequently, in the assembled position, the wires 60, through the contacts 57, are electrically connected to the pins 56 of the relay 11. The upper portion of the socket 12 is wider than the lower, resulting in downwardly facing shoulders 62 and 63 along the two opposite sides 64 and 65 of the socket. When the socket 12 is positioned in the attaching unit 10, the shoulders 62 and 63 engage the ends 35 of the spring arms 34 formed on the walls 20 of the unit 10. Accordingly, the socket 12 is supported by the spring arms 34. In addition, the lower surface of the grommet 61 overlaps the flanges 18 at the bottom edges of the walls 17, so that there is positive retention of the socket.

At the upper part of the socket 12 is a pair of short parallel flanges 67 projecting outwardly from one end of the socket, with similar flanges 68 projecting outwardly from the opposite end. The outer side surfaces of the flanges 67 and 68 are flush with and form continuations of the upper parts of the opposite sides 64 and 65 of the socket 12. Between the flanges 67, the end surface 69 of the socket is recessed, and, intermediate the flanges 68, the end wall 70 of the socket 12 similarly is recessed. The central upper end wall portions 71 and 72, however, are not recessed, extending outwardly the same distance as the flanges 67 and 68.

When the socket 12 is assembled with the unit 10, the walls 19 are received between the flanges 67 and 68. These flanges project outwardly beyond the plane of the lower portion 24 of the wall 19 (see FIG. 4). The intermediate upper end portions 71 and 72 fit in the openings 21 in the walls 19.

The attaching unit 10 is connected to the track 13, with the socket 12 in place, by moving it upwardly through the rectangular opening 73 in the upper wall 74 of the track. The upper portions 23 of the walls 19 are closer together than the spacing between the side edges 75 and 76 of the opening 73, which facilitates entry of the unit 10 into the opening in the track. As the attaching unit 10 is moved upwardly through the opening 73, the downwardly inclined upper surfaces 30 of the tabs 29 engage the side edges 75 and 76 of the opening. This deflects the walls 19 inwardly, movement which is permitted because of the recessed configuration of the adjacent walls 69 and 70 of the socket 12. The openings 21 in the lower portions 24 of the walls 19 enhance the flexibility of these parts of the walls 19 and facilitate the movement of the unit 10 into the opening 73. After the bottom edges 31 of the tabs 29 have reached the upper surface of the wall 74 of the track 13, the walls 19 straighten out and the tabs 29 snap in place above the wall 74. The spacing between the outer surfaces of the lower portions 24 of the walls 19 is substantially the same as that between the edges 75 and 76 of the opening 73, which assures engagement of the lower edges 31 of the tabs with the wall 74.

The outer edges of the socket flanges 67 and 68, as well as the central end wall portions 71 and 72, are spaced apart substantially the same distance as that between the parallel depending rails 77 and 78 of the track 13. Consequently, when the attaching unit 10 is moved upwardly into position, the flanges 67 and 68 and the end wall portions 71 and 72 fit snugly between the rails 77 and 78 and position the socket firmly against lateral movement.

The outer edges of the flanges 67 and 68, and the upper central end wall portions 71 and 72, also fit beneath the wall 74 of the rack 13 outwardly of the side edges 75 and 76 of the opening 73. This prevents upward movement of the socket 12, and hence the unit 10, relative to the track 13. Accordingly, the flanges 67 and 68 and the end wall portions 71 and 72 cooperate with the tabs 29 in holding the socket and attaching unit 10 against vertical movement.

The relay 11 then is attached to the socket 12, completing the assembly. This is accomplished merely by moving the relay downwardly between the walls 19 so that the depending contact pins 56 can enter the openings 58 to engage the socket contacts 57. In order for the relay to be moved downwardly in this manner, the knob 42 is rotated sufficiently to cause the bayonet pins 52 and 53 to pass by the edges 28 at the upper ends of the walls 19. When the relay is fully mated with the socket 12, the knob 42 is rotated back to position the pins 52 and 53 transversely relative to the relay, causing the pins 52 and 53 to enter the bayonet slots 26. The compression spring 45 then biases the knob 42 upwardly so that the pins 52 and 53 are held in the inner recessed portions 27 of the bayonet slots 26, and the unit is fully secured in place. The reinforcing ribs 25 help maintain the upper wall portions 23 in the proper position to accept the pins 52 and 53 in the bayonet slots 26. Installation is very rapidly and easily accomplished in this manner, and does not require the use of tools.

The spring arms 34, which flex in the direction of the planes of the wall 20, hold the upper surface 79 of the socket 12 firmly against the gasket 55 of the relay 11. This assures that the socket 12 will never be loose in its mounting, and will always tightly engage the gasket 55, irrespective of tolerance conditions. The environmental seal between the relay and socket is preserved, and there are no loose parts in the assembly. With the spring arms 34 flexing in the planes of the walls 20, the spring arms can exert considerable force, yet they are compact and simple to form.

Once the relay 11 is within the unit 10, the latter cannot be removed from the track 13 because the walls 19 cannot be deflected inwardly sufficiently to cause the tabs 29 to clear the edges 75 and 76 of the opening 73 in the track. This is because the relay housing 37 fits closely between the walls 19 and prevents such movement. Thus, there is a positive locking of the unit to the track. Nevertheless, disassembly is readily effected merely by pushing downwardly on the knob 42 and then rotating it a few degrees to cause the pins 52 and 53 to leave the bayonet slots 26. The relay then may be pulled upwardly to disengage the socket and to become free of the attaching unit 10. The knob 42, positioned at the upper end of the assembly, is easily grasped and pulled to remove the relay, even where the relay is closely crowded in with other elements. The pin 43 engages the knob at the lower end of the opening 44 to hold the knob to the relay when the knob is used to remove the relay. Squeezing the walls 19 toward each other, following removal of the relay, will free the tabs from the upper wall 74 of the track 13 and allow the attaching unit to be moved downwardly and outwardly of the opening 73.

A positive indication of whether or not the relay is properly engaged with the socket 12 is afforded by the cross slot 48 in the knob 42. The parts are proportioned such that the pins 52 and 53 cannot enter the bayonet slots 26 until the relay 11 is moved to its fully mated position with the socket 12. The bottom surface 80 of the knob 42 will engage the plate 39 on the relay 11 to stop the downward movement of the knob before the bayonet pins 52 and 53 have reached the entrances to the bayonet slots 26 if the relay has not been shifted downwardly a sufficient distance to mate properly with the socket 12. With further downward movement of the knob 42 being blocked, the bayonet pins 52 and 53 are prevented from entering the bayonet slots 26.

Observing the slot 48 in the transverse position is an indication, therefore, that the relay is properly installed. Conversely, if the slot 48 is at an angle and not transverse to the track 13, it is known that the latch mechanism has not engaged and the relay is not properly installed. The position of the slot 48 is readily discerned because it is at the outer end of the unit where it is most easily seen. The bayonet pins 52 and 53 also are at the upper end and visible when the unit is inspected. In addition to being a position indicator, the slot 48 can be engaged by a screwdriver if it is desired to rotate the knob 42 in that manner.

I claim:

1. A device for releasably retaining a duality of plug-in components in a mated position comprising
 a first member defining an opening,
 and a retainer unit, said retainer unit including
  a first portion on one side of said first member adjacent said opening,
   said first portion including resilient means for biasing a first electrical component toward said opening for holding said first electrical component adjacent said opening,
  and a duality of elements extending through said opening,
 said elements having outer ends spaced outwardly from the opposite side of said first member,
  said outer ends including recess means engageable by a locking member on a second electrical component for holding said second electrical component,
 said elements including abutments overlapping said first member adjacent said opposite side for holding said retainer unit against movement in one direction relative to said first member, said elements being deflectable adjacent said abutments for permitting movement of said abutments inwardly and the separation of said retainer unit from said first member by relative movement in said one direction.

2. In combination with a first electrical component mateable with a second electrical component, a mounting arrangement for holding said first and second components in a mated condition comprising
 a first means defining an opening,
 a retainer unit, said retainer unit including opposed elements extending through said opening, abutment means on said elements engageable with said first means at one end portion of said opening, said first electrical component having an abutment means engageable with said first means at the opposite end portion of said opening for cooperating with said first-mentioned abutment means in holding said retainer unit to said first means, said retainer unit including resilient means engaging said first electrical component for biasing said first electrical component such that said abutment means thereof is so engageable with said first means, said second electrical component being in a position where it is mated with said first electrical component, and releasable means interconnecting said second electrical component and said elements outwardly of said one end portion of said opening for holding said second electrical component in said position.

3. A device as recited in claim 2 in which said elements are deflectable for freeing said abutment means thereof from said first means at said one end portion of said opening for permitting removal of said retainer unit.

4. A device as recited in claim 3 in which said second electrical component includes means preventing deflection of said elements for preventing removal of said retainer unit from said first means while said second electrical component is so held in said position, and for permitting said removal of said retainer unit when said second electrical component is released from said releasable means and is remote from said position.

5. In combination with a relay and a socket mateable with said relay, a mounting device for holding said relay and socket in a mated condition comprising
support means,
said support means defining an opening,
a retainer unit,
said retainer unit including opposed walls extending through said opening,
each of said walls including an abutment overlapping said support means adjacent one end of said opening,
said opposed walls being deflectable inwardly at said abutments to cause said abutments to be moved away from said support means for permitting separation of said retainer unit from said support means,
said retainer unit including means for holding said socket adjacent the opposite end of said opening and preventing said socket from moving outwardly relative to said support means,
said socket including abutment means engageable with said support means adajcent said opposite end of said opening,
said abutment means of said socket including oppositely extending flanges projecting outwardly from the end surfaces of said socket,
said flanges of said socket including a first pair of flanges positiond one on either side of one of said walls and projecting outwardly therefrom, and a second pair of flanges positioned one on either side of the other of said opposed walls and projecting outwardly therefrom,
for cooperating with said abutments of said walls for positioning said socket and retainer unit against substantial movement relative to said support means,
said relay being positioned between said opposed walls adjacent said one end of said opening,
and releasable means interconnecting said relay and said opposed walls for holding said relay in said position thereof.

6. In combination with a first electrical component mateable with a second electrical component, a mounting arrangement for holding said first and second components in a mated condition comprising
a first means defining an opening,
a retainer unit, said retainer unit including opposed elements extending through said opening, abutment means on said elements engageable with said first means at one end portion of said opening, said first electrical component having an abutment means engageable with said first means at the opposte end portion of said opening for cooperating with said first-mentioned abutment means in holding said retainer unit to said first means, said retainer unit including means holding said first electrical component such that said abutment means thereof is so enageable with said first means, said second electrical component being in a position where it is mated with said first electrical component,
releasable means interconnecting said second electrical component and said elements outwardly of said one end portion of said opening for holding said second electrical component in said position,
and means for preventing said releasable means from so interconnecting said second electrical component and said elements when said second electrical component is not in said position thereof.

7. In combination with a relay and a socket mateable with said relay, a mounting device for holding said relay and socket in a mated condition comprising
support means,
said support means defining an opening,
a retainer unit,
said retainer unit including opposed walls extending through said opening,
each of said walls including an abutment overlapping said support means adjacent one end of said opening,
said opposed walls being deflectable inwardly at said abutments to cause said abutments to be moved away from said support means for permitting separation of said retainer unit from said support means,
said retainer unit including means for holding said socket adjacent the opposite end of said opening and preventing said socket from moving outwardly relative to said support means,
said socket including abutment means engageable with said support means adjacent said opposite end of said opening,
thereby cooperating with said abutments of said walls for positioning said socket and retainer unit against substantial movement relative to said support means,
said relay being positioned between said opposed walls adjacent said one end of said opening,
releasable means interconnecting said relay and said opposed walls for holding said relay in said position thereof, and stop means for permitting said releasable means to so interconnect said relay and said opposed walls only upon a predetermined interengagement of said relay and said socket.

8. In combination with a relay and a socket mateable with said relay, a mounting device for holding said relay and socket in a mated condition comprising
support means,
  said support means defining an opening,
a retainer unit,
  said retainer unit including opposed walls extending through said opening,
    each of said walls including an abutment overlapping said support means adjacent one end of said opening,
    said opposed walls being deflectable inwardly at said abutment to cause said abutments to be moved away from said support means for permitting separation of said retainer unit from said support means,
  said retainer unit including means for holding said socket adjacent the opposite end of said opening and preventing said socket from moving outwardly relative to said support means,
  said socket including abutment means engageable with said support means adjacent said opposite end of said opening,
  thereby cooperating with said abutments of said walls for positioning said socket and retainer unit against substantial movement relative to said support means,
  said relay being positioned between said opposed walls adjacent said one end of said opening,
releasable means interconnecting said relay and said opposed walls for holding said relay in said position thereof,
and indicia on said releasable means for indicating when said releasable means is in the engaged position interconnecting said relay and said opposed walls, and when said releasable means is in the released position in which said relay is not connected to said opposed walls.

9. In combination with a relay and a socket mateable with said relay, a mounting device for holding said relay and socket in a mated condition comprising
support means,
  said support means defining an opening,
a retainer unit,
  said retainer unit including opposed walls extending through said opening,
    each of said walls including an abutment overlapping said support means adjacent one end of said opening,
    said opposed walls being deflectable inwardly at said abutments to cause said abutments to be moved away from said support means for permitting separation of said retainer unit from said support means,
  said retainer unit including means for holding said socket adjacent the opposite end of said opening and preventing said socket from moving outwardly relative to said support means,
  said socket including abutment means engageable with said support means adjacent said opposite end of said opening,
  thereby cooperating with said abutments of said walls for positioning said socket and retainer unit against substantial movement relative to said support means,
  said relay being positioned between said opposed walls adjacent said one end of said opening, and
releasable means interconnecting said relay and said opposed walls for holding said relay in said position thereof,
said releasable means including
slot means in said walls outwardly of said support means,
pin means carried by said relay and engageable with said slot means,
and resilient means biasing said pin means toward a position in which said pin means is retained in said slot means,
  said pin means being manually movable in opposition to said resilient means for releasing said pin means from said slot means.

10. A device as recited in claim 9 in which
said slot means includes
  means defining a bayonet slot in each of said opposed walls,
  said bayonet slots facing in opposite directions,
said pin means includes
  a rotatable member, and a bayonet pin extending outwardly in either of two opposite directions from said rotatable member,
    said bayonet pins being engageable with said opposed walls in said bayonet slots, said rotatable member being rotatable to a position in which said bayonet pins are remote from said bayonet slots for thereby releasing said relay,
  and said resilient means includes a compression spring biasing said rotatable member in one direction for holding said bayonet pins in said bayonet slots.

11. A device as recited in claim 10 in which
said rotatable member is movable axially for permitting said bayonet pins to so engage said opposed walls at said bayonet slots,
  said rotatable member being so movable axially through a limited stroke such that said bayonet pins can enter said bayonet slots only upon a predetermined interengagement of said relay and said socket.

12. In combination with a relay and a socket mateable with said relay, a mounting device for holding said relay and socket in a mated condition comprising
support means,
  said support means defining an opening,
a retainer unit,
  said retainer unit including opposed walls extending through said opening,
    each of said walls including an abutment overlapping said support means adjacent one end of said opening,
    said opposed walls being deflectable inwardly at said abutments to cause said abutments to be moved away from said support means for permitting separation of said retainer unit from said support means,
  said retainer unit including means for holding said socket adjacent the opposite end of said opening and preventing said socket from moving outwardly relative to said support means, said socket including abutment means engageable with said support means adjacent said opposite end of said opening,
thereby cooperating with said abutments of said walls for positioning said socket and retainer unit against substantial movement relative to said support means,
said socket having walls adjacent said opposed walls, said socket walls being spaced from said opposed walls for permitting said opposed walls to be moved inwardly a sufficient distance to allow said abutments of said opposed walls to pass through said opening for permitting said retainer unit to be attached to and released from said support means,
said relay being positioned between said opposed walls adjacent said one end of said opening, and
releasable means interconnecting said relay and said opposed walls for holding said relay in said position thereof.

13. In combination with a relay and a socket mateable with said relay, a mounting device for holding said relay and socket in a mated condition comprising
support means,
said support means defining an opening,
a retainer unit,
said retainer unit including opposed walls extending through said opening,
each of said walls including an abutment overlapping said support means adjacent one end of said opening,
said opposed walls being deflectable inwardly at said abutments to cause said abutments to be moved away from said support means for permitting separation of said retainer unit from said support means,
said retainer unit including means for holding said socket adjacent the opposite end of said opening and preventing said socket from moving outwardly relative to said support means,
said socket including abutment means engageable with said support means adjacent said opposite end of said opening,
thereby cooperating with said abutments of said walls for positioning said socket and retainer unit against substantial movement relative to said support means,
said relay being positioned between said opposed walls adjacent said one end of said opening,
releasable means interconnecting said relay and said opposed walls for holding said relay in said position thereof,
and resilient means on said retainer unit engaging said socket and biasing said socket toward said support means at said opposite end of said opening for holding said socket against said relay.

14. A device as recited in claim 13 in which
said retainer unit includes a duality of additional opposed walls,
said socket includes a shoulder adjacent each of said additional opposed walls, and in which said resilient means includes a spring member integral with each of said additional opposed walls,
each of said spring members engaging one of said shoulders of said socket.

15. A device as recited in claim 14 in which each of said additional walls is of sheet metal, said spring members being formed from said additional opposed walls, and deflectable in the principal planes of said additional opposed walls.

* * * * *

PO-1050
(5/69)

UNITED STATES PATENT OFFICE
CERTIFICATE OF CORRECTION

Patent No. 3,790,915          Dated February 5, 1974

Inventor(s) Alanson G. Dugan and John Lockyer

It is certified that error appears in the above-identified patent and that said Letters Patent are hereby corrected as shown below:

In the designation of the assignee, "Deutach" should read ---Deutsch---.

Signed and sealed this 17th day of September 1974.

(SEAL)
Attest:

McCOY M. GIBSON JR.
Attesting Officer

C. MARSHALL DANN
Commissioner of Patents